Oct. 7, 1969  P. H. BURNIER ET AL  3,471,726

SYNCHRONOUS DYNAMO-ELECTRIC MACHINES

Filed Oct. 7, 1965  3 Sheets-Sheet 1

Inventors
PIERRE H. BURNIER
ANDRE EDOUARD WOLFHUGEL
By Holcombe, Wetherill & Brisebois
Attorneys

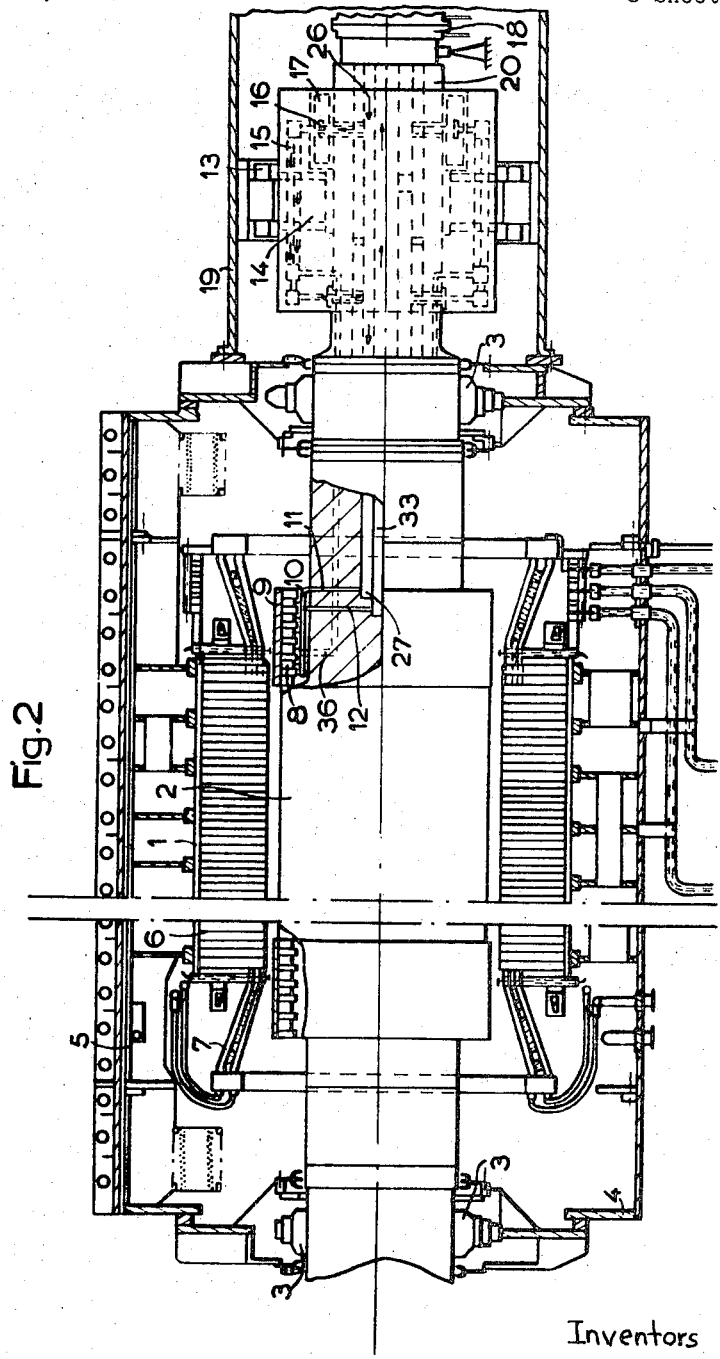

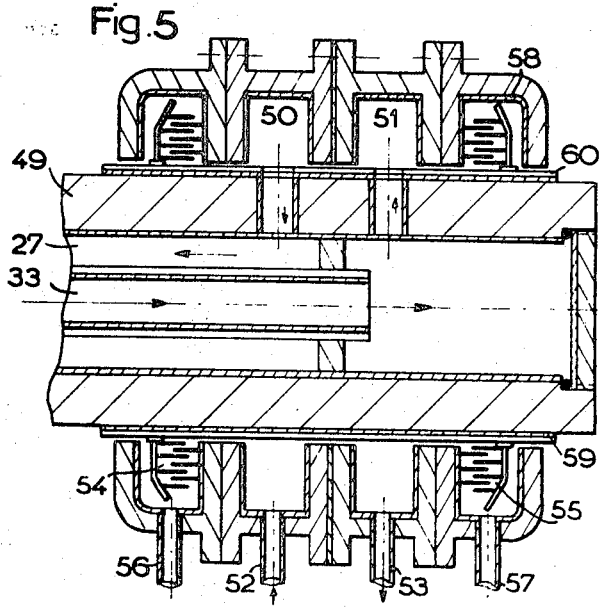
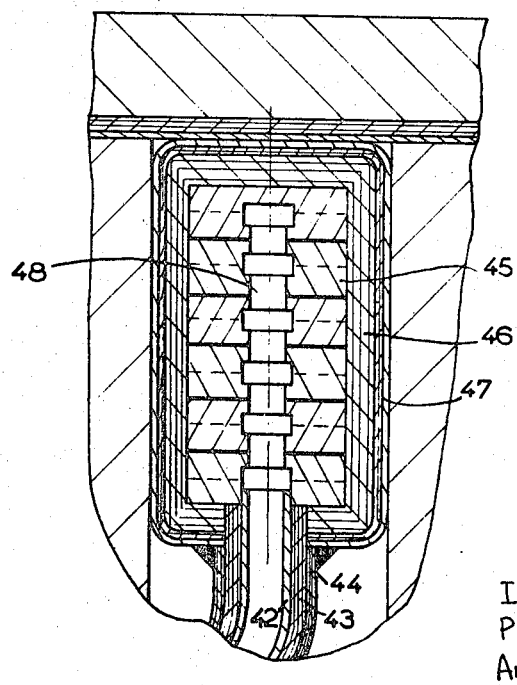

:::
United States Patent Office 3,471,726
Patented Oct. 7, 1969

---

3,471,726
SYNCHRONOUS DYNAMO-ELECTRIC MACHINES
Pierre Henri Burnier, Versailles, and Andre Edouard Wolfhugel, Belfort, France, assignors to Societe Generale de Constructions Electriques et Mecaniques Alsthom, Usines de Belfort, Belfort, France, a French body corporate
Filed Oct. 7, 1965, Ser. No. 493,704
Claims priority, application France, Oct. 7, 1964, 2,552
Int. Cl. H02k 9/20
U.S. Cl. 310—54           2 Claims

ABSTRACT OF THE DISCLOSURE

This invention realtes to synchronous dynamo-electric machines and its object is to ensure the maintenance of the voltage at the terminals at a given value and also to maintain synchronism if the load varies. In accordance with the invention, such a machine comprises a rotor having a field winding made of a very pure metal and this winding is cooled to a low temperature by conduits that are arranged to conduct a cryogenic fluid. An alternator exciter rotor is mounted on the rotor shaft and a field winding is fed electrically from current rectifiers, consituted by semiconductors, from this alternator exciter rotor and an exciter armature winding is mounted on the exciter rotor and is constituted also by a very pure metal. An assembly constituted by the field winding of the machine, the current rectifiers and the exciter armature winding, are cooled by cryogenic fluid.

---

Figure 1:
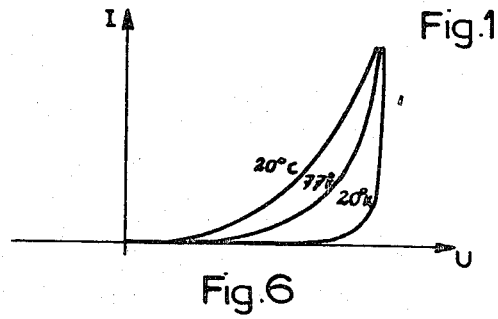

In the operation of a synchronous generating or motive machine, it is essential to use an excitation device associated therewith. Such a device ensures the maintenance of the voltage at the terminals at a given volume, and of maintaining synchronism when the load varies.

In recent years, the excitation power has increased considerably, in particular with turbo-alternators. Having used an exciter directly driven at the tail-shaft of the latter, the exciter is driven by a speed reducer. The dimensions of such an excitation device have become large with respect to those of the generator; moreover, the slip-rings of the generator have to pick up strong currents, for example 3500 a. for a power of 600 mw.

Therefore attempts have been made to eliminate the main and driven exciters, amplidyne generators, etc., the speed reducer and the slip-rings, and thus to avoid the disadvantages inherent in their use and their maintenance, by using an alternator-exciter whose field winding is fixed and whose armature is mounted on the shaft of the generator and thus rotates at the same speed as the latter, this enabling it to be given reduced dimensions. The armature winding of the exciter delivers the excitation current from the synchronous machine by means of semi-conductive rectifier cells which are also fixed to the shaft.

This arrangement, although it has the advantage of a great simplification of the ancillary equipment of the excitation device and a very considerable reduction of the bulk of the assembly, must be of such dimensions as to supply a considerable power, such as for example 2000 kw. for an alternator of 600 mw.

The present invention has for an object improvements in these arrangement particularly by reducing the power and bulk thereof.

Proposals have already been made to produce the field winding of a turbo-alternator of metal which is as pure as possible and to cool it by a low temperature fluid so as to reduce the excitation losses to a very low value, the excitation current being conveyed to the slip-rings through connections connected to an exciter machine which may or may not be carried by the rotor. This device could produce faults and cause a reheating of the cryogenic liquid by reason of the conductivity of the connecting wires between collector rings and alternator-exciter, unless special precautions are incorporated.

The arrangement according to the invention for exciting a synchronous electrical machine comprising a field winding made of metal or an alloy which is as pure as possible (proportion of impurities lower than a few tens of parts per million), cooled to a low temperature, supplied by an alternator-exciter mounted on the shaft of the motor, by means of a current rectifier system, is essentially characterised in that the armature winding of the exciter is also constituted by a metal or alloy which is as pure as possible and in that the assembly of the field winding of the synchronous machine, current rectifier system and armature winding of the exciter is cooled by the same continuous circuit of cryogenic fluid, such as hydrogen, neon or nitrogen.

The uninterrupted circuit of cryogenic fluid reduces the heat losses. The general bulk of the accessories of this circuit, both electrical and cryogenic, is considerably reduced. Moreover, the excitation power becomes very small, and the conditions for regulating and maintaining the stability of the synchronous machine are clearly improved.

The rectifier system operating at a low temperature, may take many forms, e.g. vacuum tubes, mercury vapour rectifiers, or super-conductive rectifiers, but the invention preferably utilises semi-conductors, e.g. simple diodes, controlled rectifiers, transistors, or semi-conductors having a field effect.

Shockley's theory leads us to expect that the resistivity of semi-conductors must increase considerably during operation at very low temperatures. Thus it could be feared that semi-conductors are not utilisable between 15° K. and 60° K. especially those with a base of silicon.

Measurements have been made with simple diodes and rectifiers comprising control electrodes. The current-voltage characteristics have been plotted down to the temperature of liquid hydrogen.

Figure 6:
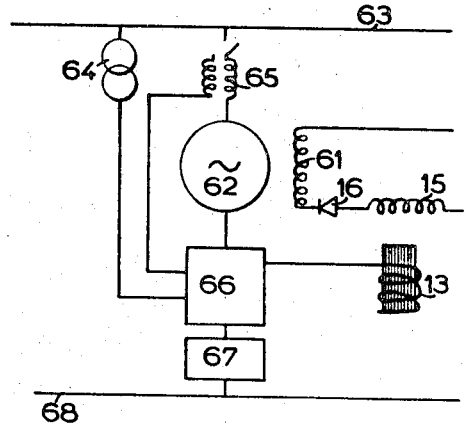
Figure 3:
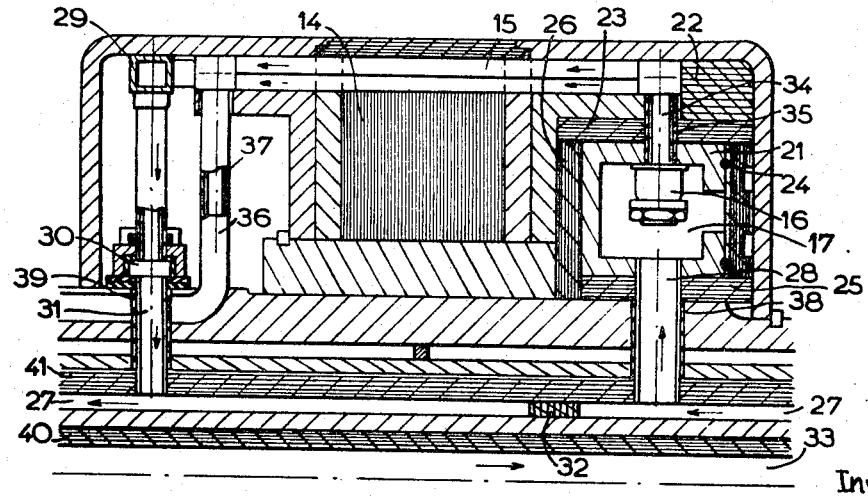

In order that the invention may be more clearly understood, reference will now be made to the accompanying drawings which show some embodiments thereof by way of example, and in which:

FIGURE 1 shows characteristic voltage-current curves,
FIGURE 2 schematically shows a longitudinal section through a turbo-alternator provided with an excitation arrangement according to the invention,
FIGURE 3 schematically shows the ancillary equipment for the excitation device and the connections fixed to the rotor,
FIGURE 4 shows an arrangement for passing cryogenic fluid into or out of a winding,
FIGURE 5 shows an input and output device for the cryogenic fluid mounted on the tail-shaft and,
FIGURE 6 is a simplified single-wire diagram of the circuits for exciting a synchronous machine.

Referring now to the drawings, FIGURE 1 shows by way of example one of the series of characteristics, for respective temperatures of 20° C., 77° K. and 20° K. The results show that the use of semi-conductors with a base of silicon, germanium, intermetallic alloys, or others, may be envisaged without difficulty between 15° K. and 60° K., because the slight increase in the drop in direct current is compensated by the very clear increase of the slope of the direct current-voltage curve. A good security of operation is obtained for rectifiers utilised under these conditions, because the gap between the temperature of use and the limiting temperature acceptable by the semi-conductor is markedly increased, and the reverse voltage which the rectifier may withstand is increased. Moreover, the construction of the rectifier elements may be simplified by using connections of small section made of very pure metal.

According to the example of FIGURE 2, a turbo-alternator is made up of a stator 1, and rotor 2 which rotates in bearings 3 supported by flanges 4 fixed to a frame 5; a fixed magnetic circuit 6 supports a winding 7 whose conductors are cooled directly by the circulation of a liquid such as water or oil or even a low temperature fluid.

The rotor comprises a certain number of field coils or windings constituted by hollow conductors made of metal which is as pure as possible and provided with heat and electrical insulation; the ends 8 of these coils or windings are located below hoops 9 which retain them. These coils or windings are supplied with cryogenic fluid by means of collectors 10 and input and output conduits 11 and 12 respectively.

The excitation current is supplied by an alternator exciter comprising a stator carrying field windings 13, and a rotor 14 provided with an armature winding 15 made of metal which is as pure as possible, and provided with heat and electrical insulation. This alternator-exciter is shown in greater detail in FIGURE 3.

Rectifiers 16 rotating with the shaft of the rotor are arranged in a compartment 17. A housing 18 for the input and output of liquid is mounted on the tail-shaft.

The alternator-exciter, the rectifiers 16 and the housing 18 are enclosed in a cover 19, provided with inspection gates (not shown); if desired however, they may alternatively be placed between the bearing 3 and the body of the rotor, but the difficulties of access and maintenance of such an arrangement render that of FIGURE 2 preferable; on the other hand, the diameter of the tail-shaft 20 may be substantially smaller than within the machine, and the result is an appreciable gain so far as the dimensions of the ancillary equipment and its cost is concerned.

The number and size of the rectifiers 16 may be considerably reduced, and it is easy to locate them in the compartment 17 arranged between the armature winding 15 of the exciter and the tail-shaft 20. This compartment 17 could be placed between the armature 14 and the body of the rotor of the main machine, but for reasons of accessibility to the cells and to the fuses, it is preferably placed on the side opposite to the armature 14. The compartment 17 is defined by a ring 21 made of stainless steel, open at the right hand side of the drawing and surrounded by bands 22, 23 and 25, as heat insulation.

The cryogenic liquid enters the housing 18 at a temperature between 15° and 80° K., and from there it passes into a longitudinal annular channel 27; then it enters the compartment 17 through a radial channel 28.

The compartment 17 communicates, by means of radial tubes (which have not been shown in the drawing in order not to complicate it), with the bars of the armature winding 15. The cryogenic liquid thus traverses the winding 15 through the collectors 29 and 30 and the radial channel 31, returns into the longitudial channel 27, but in that part of the latter situated on the side of the main machine and separated from the input by a stopper 32 placed between the channels 28 and 31. This stopper 32 could be replaced by a diaphragm, so as to allow only the outflow of cryogenic liquid necessary for cooling the winding 15 and the rectifier cells 16 to pass into the channel 28. This part of the channel 27 is situated on the side of the machine and extends as far as the conduit 11 for the input of the cryogenic liquid in the collector 10.

The cryogenic liquid leaves the rotor coils of the turbo-alternator in the conduit 12, then flows into the central longitudial conduit 33 as far as the housing 18 and there it returns to apparatus (not shown) for producing the cryogenic liquid.

The rectifying cells 16 are connected to the bars of the winding 15 by means of hollow connections 34 made of metal which is as pure as possible, surrounded by heat and electrical insulation 35. The diametrically opposite slots in the armature 14 serve to allow electrical connections 36 to pass through, the latter connecting the rectifier cells 16 to the field winding of the turbo-alternator. These connections 36, made of metal of the same nature and same purity as that of the windings, are hollow and covered with a heat electrical insulation 37. Thus they pass the cryogenic fluid at the same time as they convey the excitation current.

Certain slots which do not possess winding bars but contain tubes conveying the cryogenic fluid may be provided in the armature 14. The outflow of these tubes is added to that which passes into the winding bars, in order that the total outflow of cryogenic fluid traversing the armature 14 is sufficient to ensure the cooling of the field winding of the turbo-alternator.

Insulating tubes 38 and 39 thermally insulate the channels 28 and 31. The central channel 33 of the shaft is thermally insulated by a covering 40 and the annular channel 27 by a covering 41.

FIGURE 4 shows an example of a connection of a field coil of the turbo-alternator with a collector of cryogenic liquid. A connecting tube 42 surrounded by heat insulation 43 and a covering 44 for holding this insulation penetrates into a winding bar 45. The latter is composed, in a known manner, of grooved conductors forming, by the way they are stacked, cooling channels, and it is surrounded by a heat insulation 46 and electrical insulation 47. At that location where their connection is effected, all the conductors are connected by a radial channel 48. The connections of these conduits of cryogenic liquid to the armature winding of the exciter may be effected in a similar manner.

FIGURE 5 shows a housing arrangement such as 18, placed on the tail-shaft in order to introduce and withdraw the cryogenic liquid. The housing is arranged about the tail-shaft 49 so as to constitute an annular space 50 communicating with the channel 27 and an annular space 51 communicating with the channel 33. The arrival of the cryogenic liquid is effected by means of the tube 52 and the output by means of the tube 53. Labyrinths 54 and 55 reduce the losses of cryogenic liquid which flow through the tubes 56 and 57 towards the apparatus (not shown) for producing said liquid. The internal surfaces of the housing are covered by heat insulation 58. Moreover, a heat-insulated sheath 59 protected by a stainless steel tube 60, surrounds the tail-shaft.

In order to ensure the adjustment of the synchronous machine, an arrangement may be used such as that shown by the circuit of FIGURE 6. The armature winding 15 of the exciter delivers, by means of rectifiers 16, to the field winding 61 of an alternator 62 connected to a network 63; the resultant vector of transformers 64 and 65 reacts on a regulating housing 66, supplied on the other hand by a rectifier unit 67 connected to an auxiliary network 68; this regulator 66 controls the excitation current of the coils 13 mounted on the field winding, preferably laminated, of the exciter.

In a modification, in order to accelerate the response of the exciter system, in particular the de-excitation of the main machine, the rectifiers 16 may be thyratrons whose control electrode is under the control of the regulator 66.

In this specification the expression, "pure as possible" includes "commercially pure": it does not signify that the metal must be of absolute chemical purity.

We claim:

1. A synchronous dynamo-electric machine comprising a rotor having a field winding made of a metal which is as pure as possible, conduits conducting a cryogenic fluid to cool said field winding to a low temperature, an alternator exciter rotor mounted on the shaft of said rotor, said field winding being fed electrically via current rectifiers, constituted by semi-conductors, from said alternator exciter rotor, an exciter armature winding on said exciter rotor and also constituted by a metal which is as pure as possible, connections connecting said semi-conductors between said exciter winding and said field winding of said synchronous machine, said connections being made of metals which are as pure as possible, the assembly constituted by said field winding of said synchronous machine, said current rectifiers and said exciter armature winding being cooled by cryogenic fluid.

2. A machine according to claim 1, wherein said windings are hollow and also convey said cryogenic fluid, said windings having heat insulation thereon and said windings being completed by heat-insulated hollow electrical connections and by heat-insulation conduits for conveying or evacuating said fluid, and wherein said semi-conductors are arranged in a heat-insulated enclosure disposed in the path of said cryogenic fluid.

References Cited
UNITED STATES PATENTS

| | | | |
|---|---|---|---|
| 3,145,314 | 8/1964 | Becker | 310—64 |
| 3,154,706 | 10/1964 | Richardson | 310—54 |
| 3,289,019 | 11/1966 | Buchhold | 310—52 |
| 3,368,087 | 2/1968 | Madsen | 310—10 |
| 3,021,433 | 2/1962 | Morrison | 307—88.5 |
| 3,121,808 | 2/1964 | Dawon-Kahng et al. | 307—88.5 |
| 3,374,408 | 3/1968 | Sander | 317—235 |

DAVID X. SLINEY, Primary Examiner

U.S. Cl. X.R.

310—10